Figure 1:
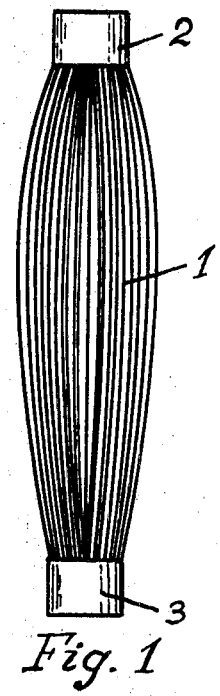

United States Patent

[11] 3,570,673

[72] Inventors Hubert Dutz
 Mainz-Gonsenheim;
 Hans-Otto Mulfinger, Mainz-Mombach;
 Johann Friedrich Pfrommer, Kelkheim,
 Germany
[21] Appl. No. 855,192
[22] Filed Sept. 4, 1969
[45] Patented Mar. 16, 1971
[73] Assignee Jenaer Glaswerk Schott & Gen
 Mainz, Germany
[32] Priority Sept. 7, 1968
[33] Germany
[31] P 17 98 208.0

[54] SEPARATION COLUMN FOR LIQUID CHROMATOGRAPHY
 4 Claims, 5 Drawing Figs.
[52] U.S. Cl. ..................................................... 210/198,
 55/386, 210/500
[51] Int. Cl. ...................................................... B01d 15/08

[50] Field of Search............................................ 55/67, 197,
 386; 65/(LR Digest); 210/31 (C), 198 (C), 500,
 496, 508, 509

[56] References Cited
UNITED STATES PATENTS

| | | | |
|---|---|---|---|
| 2,354,931 | 8/1944 | Tolman......................... | 65/18X |
| 3,005,514 | 10/1961 | Cole et al...................... | 55/386 |
| 3,455,625 | 7/1969 | Brumley et al................ | 210/500X |

Primary Examiner—J. L. DeCesare
Attorney—Singer, Stern and Carlberg

ABSTRACT: A separation column for liquid chromatography is constructed by taking a bundle of parallel inorganic chemical fibers produced from glass which serves as a liquid stationary phase and surrounding it by a sleeve of chemically resistant material which is shrunk on said bundles of fibers. After a heat treatment a phase separation takes place and then the soluble phase is eliminated by a leaching and washing procedure so that a porous glass remains.

PATENTED MAR 16 1971  3,570,673

INVENTORS
Hubert Dietz, Hans-Otto Mulfinger
BY Johann Friedrich Pfrommer
Singer, Stern & Carlberg
Attorneys

SEPARATION COLUMN FOR LIQUID CHROMATOGRAPHY

The invention relates to separation columns for liquid-chromatography and to methods for its production. The decisive part of the entire apparatus comprises the employment of "chromatography-columns." The known chromatography-columns are customarily produced by introducing into a tube provided with a suitable closure the most finely pulverized and classified chromatography-material. It is, however, seldom possible to attain with necessarily narrow chromatography-columns a uniform packing of the chromatography-material or of the carrier in the stationary phase of the distribution-chromatography. The smallest channels, which are necessary, up to now are formed only with difficulty or not at all between grains of 5—500 $\mu$ diameter at column cross-sectional surfaces of 1 mm.$^2$ to 10 cm.$^2$ and with column-lengths of 0.05 to 15 m.

The object of the present invention is a separation column for liquid-chromatography in which the stationary phase for the desired separation effect is provided with the necessary uniform channels of 0.5 to 100 $\mu$ over a length up to 15 m. and at a cross section up to several hundred square centimeters. Furthermore, the flow resistance is uniform over great lengths. This object is solved in accordance with the invention in this manner, that as stationary phase or as carrier of the liquid stationary phase is used a bundle of inorganic fibers or organic fibers, which is surrounded by a chemically resistant sleeve of glass, metal or synthetic material.

The invention makes it possible to attain the favorable characteristics mentioned, which were not attainable previously, as well as to make possible through the previously impossible high reproducibility, an electrical interconnection of several such columns to form batteries even for larger weight rates of flow.

Good results are attained if the bundle of fibers consists of porous glass known in itself.

It is advisable to modify the surface in order to improve the separation capacity of the columns. The effect of the surface modification consists therein, that polar points in the surface of the carrier are covered by nonpolar substances. For this purpose are adapted for example trimethyl-chloro-silane, carbon or amino-groups.

As organic chemical fibers are adapted for many purposes such as are made of polyamide.

In a preferred embodiment of the invention, the cover or envelope consists of a shrunken tube made of chemically resistant synthetic material, which as the case may be is surrounded or reinforced with a metal sleeve.

During the production of separation columns according to the invention, the fibers are drawn in known manner from a glass, in which upon heat treatment a phase-separation occurs. The soluble phase is then eliminated so that a porous glass is produced. The fiber size lies suitably in the range of 5 to 200 $\mu$ m. The size is adjusted according to the particular purpose of use, particularly also to the bending radius, the desired weight rate of flow and the required separation capacity.

In accordance with the invention, it is also possible to construct the tempered glass fibers porously first after the enveloping or sheathing by means of elimination of the soluble phase.

The cover or envelope may also be produced by drawing the bundle of fibers wrapped in a foil of synthetic material into a tube and filling the remaining circular gaps with thermoplastic or Duroplastic.

In the following are described by way of example four embodiments of separation columns in accordance with the invention.

EXAMPLE 1

There is produced a bundle of fibers from the tempered, however still not leached starting glass with 7 Mol-percent $Na_2O$, 23 Mol-percent $B_2O_3$, 70 Mol-percent $SiO_2$ with a diameter of approximately 2—15 mm. and a length of 0.1—15 m. This bundle is drawn into a shrinkable, chemically resistant tube of synthetic material and subsequently thereto the tube is shrunk solid on the bundle by means of a suitable heat treatment. If the separation column is later to be operated at high pressures, then it is necessary to surround it by a protective sleeve of metal. The separation column produced in this way and consisting still of nonporous glass is now subjected to the leaching process. For this purpose, the column is attached to an acid-resistant pressure pump, with the aid of which the acid, the rinsing water, the lye and the wash water are pressed through. The advantage of this recommended method consists therein, that the fibers surrounded by a shrunken tube indeed break, but their position cannot be changed thereby, not even during later use.

EXAMPLE 2 3

A bundle of fibers is grasped at the starting end and at the other end tightly with a metal sleeve, whereby one sleeve is provided with a ring. This bundle of fibers is drawn through a closely fitting chemically resistant tube of metal, glass or synthetic material, which may subsequently be narrowed. Thereafter, the starting end and the other end of this body are cut off, so that the metal sleeves are removed. Then starts the above described leaching process.

EXAMPLE 3

The method described here is adapted both to the production of separation columns from leached out glass fibers as well as to the production of separation columns from solely tempered but not yet leached out glass fibers. In addition, the bundle of glass fibers is wound about spirally with a foil of synthetic material, the foil is subsequently fastened. This bundle is now introduced into a loosely fitting tube of metal, glass or synthetic material. It was found to be practical to construct the pipe U-shaped. The space between bundle of fibers and the tube is filled with a fluid synthetic resin. After the filling, one may give to metal and synthetic material-tubes a desired shape, as for example, spirals and coils. Thereafter the synthetic material is hardened. This last mentioned method when using of metal tubes has the additional advantage over the first named case, that it may be employed without special pressure envelope and also for high operational pressures.

EXAMPLE 4

Bundles of chemical fibers are encased according to any one of the methods described in examples 1 to 1. A surface modification of the fibers may take place before or after the enveloping.

In the FIGS. of the drawing are illustrated diagrammatically examples of embodiments according to the invention.

Figure 5:
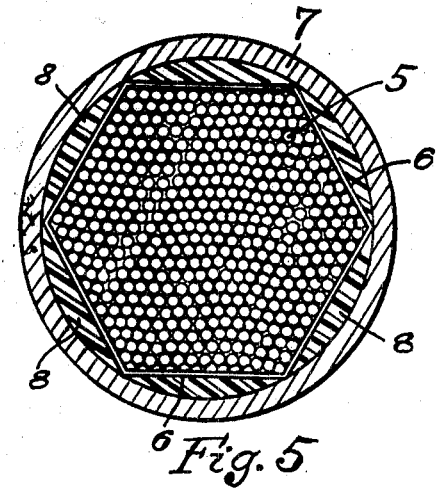

In the drawings:

FIGS. 1, 2, 3 and 4 illustrate the production of a bundle of fibers according to example 2; and FIG. 5 illustrates a cross section view of a bundle of fibers produced according to example 3.

Figure 2:
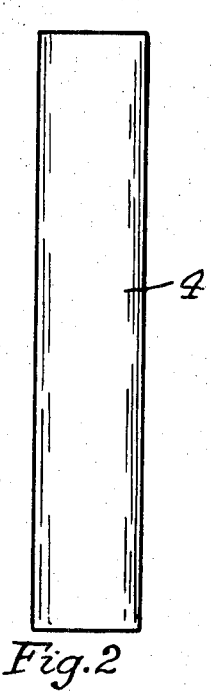
Figure 3:
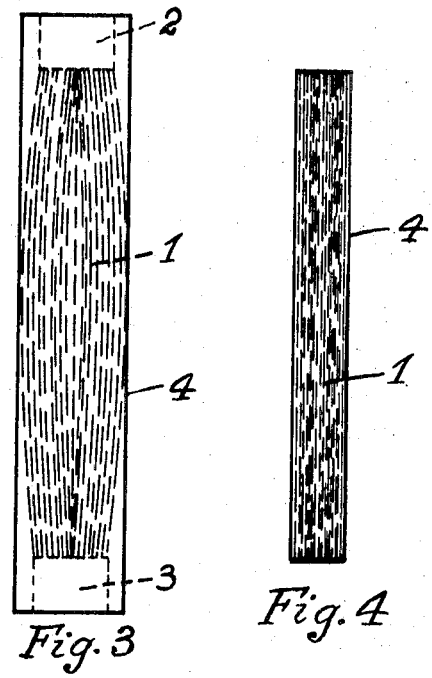
Figure 4:
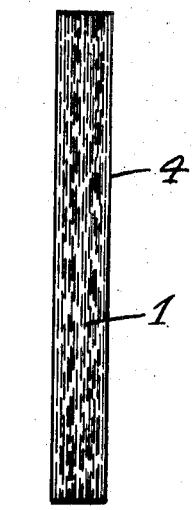

Referring to FIG. 1, a bundle of fibers 1 is provided at both of its ends with a metal sleeve 2 and 3. Directly below FIG. 1 and in alignment therewith is shown in FIG. 2 a tube 4 of synthetic material. FIG. 3 illustrates the bundle of fibers 1 provided according to FIG. 4 at its ends with the metal sleeves 2 and 3 inserted into the tube 4. FIG. 4 illustrates the manner in which after the shrinking of the tube of synthetic material, the latter is shrunk on the bundle of fibers 1. In FIG. 4, however, the metal sleeves 2 and 3 have been cut off.

FIG. 5 illustrates a bundle of fibers 5 which is hexagonal in cross section which is surrounded by a spirally wound foil of synthetic material 6. This wrapped bundle 5, 6 is introduced loosely fitting into a tube 7 made of metal, glass or synthetic material. The spaces 8 formed between the perimeter of the bundle and the inner wall of the tube 7 are filled with a fluid synthetic resin. FIG. 5 illustrates that the spaces formed between the glass fibers are formed uniformly and are very small and serve as capillaries during the separation procedure.

We claim:

1. A method for producing a separation column for use in liquid-chromatography comprising the step of inserting a bundle of parallel inorganic chemical fibers into a tube of chemically resistant material, shrinking said tube securely onto said bundle of fibers, and then forcing a solvent through said bundles of fibers to remove the soluble phase of said fibers and obtaining a porous fibrous body.

2. Separation column for use in liquid-chromatography comprising a bundle of parallel fibers consisting of porous glass serving as a liquid stationary phase surrounded by a sleeve of chemically resistant material.

3. Separation column for use in liquid-chromatography in which dissolved substances are separated from a solution, said separation column comprising a bundle of parallel inorganic fibers serving as a liquid stationary phase surrounded by a sleeve of chemically resistant material, said fibers being surface modified by means of a trimethyl-chloro-silane coating.

4. Separation column for use in liquid-chromatography in which dissolved substances are separated from a solution, said separation column comprising a bundle of parallel inorganic fibers serving as a liquid stationary phase surrounded by a sleeve of chemically resistant material, said fibers being surface modified by means of a carbon coating.